United States Patent
Akashe et al.

(10) Patent No.: US 7,094,439 B2
(45) Date of Patent: Aug. 22, 2006

(54) METHOD OF DEFLAVORING WHEY PROTEIN

(75) Inventors: Ahmad Akashe, Mundelein, IL (US); Cynthia Lynn Jackson, Evanston, IL (US); Ariel S. Cudia, Chicago, IL (US); John Wisler, Rockford, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 268 days.

(21) Appl. No.: 10/697,402

(22) Filed: Oct. 29, 2003

(65) Prior Publication Data

US 2004/0161514 A1  Aug. 19, 2004

Related U.S. Application Data

(63) Continuation-in-part of application No. 09/939,500, filed on Aug. 23, 2001, now Pat. No. 6,787,173.

(60) Provisional application No. 60/250,228, filed on Nov. 30, 2000.

(51) Int. Cl.
*A23J 1/20* (2006.01)

(52) U.S. Cl. ............... 426/657; 426/422; 426/495; 426/583

(58) Field of Classification Search ......... 426/634, 426/422, 656, 495, 583, 657
See application file for complete search history.

(56) References Cited

U.S. PATENT DOCUMENTS

| | | | |
|---|---|---|---|
| 3,995,071 A | 11/1976 | Goodnight, Jr. et al. | |
| 4,072,670 A | 2/1978 | Goodnight, Jr. et al. | |
| 4,088,795 A | 5/1978 | Goodnight, Jr. et al. | |
| 4,091,120 A | 5/1978 | Goodnight, Jr. et al. | |
| 4,100,024 A | 7/1978 | Adler-Nissen | |
| 4,205,090 A | 5/1980 | Maubois et al. | |
| 4,420,425 A | 12/1983 | Lawhon | |
| 4,477,480 A | 10/1984 | Seidel et al. | |
| 4,478,854 A | 10/1984 | Adler-Nissen et al. | |
| 4,497,836 A | 2/1985 | Marquardt et al. | |
| 4,530,788 A | 7/1985 | Chang | |
| 4,623,550 A | 11/1986 | Willard | |
| 4,632,903 A | 12/1986 | Boyce et al. | |
| RE32,725 E | 8/1988 | Howard et al. | |
| 4,761,186 A | 8/1988 | Schara et al. | |
| 4,770,891 A | 9/1988 | Willard | |
| 5,077,062 A | 12/1991 | Ernster | |
| 5,100,679 A | 3/1992 | Delrue | |
| 5,160,758 A | 11/1992 | Parks et al. | |
| 5,433,969 A | 7/1995 | McMindes et al. | |
| 5,626,899 A | 5/1997 | Payne et al. | |
| 5,658,714 A | 8/1997 | Westfall et al. | |
| 5,780,439 A | 7/1998 | Mendy et al. | |

(Continued)

FOREIGN PATENT DOCUMENTS

EP    0109868 A    5/1984

(Continued)

*Primary Examiner*—Anthony Weier
(74) *Attorney, Agent, or Firm*—Fitch, Even, Tabin & Flannery (57) ABSTRACT

Whey protein materials such as whey from cheese making processes, whey protein concentrates, and whey protein isolates, are deflavored by adjusting the pH of an aqueous composition of such whey protein materials to about 8 to about 12 to solubilize the whey proteins and to release the flavoring compounds and thereafter passing the pH-adjusted composition to an ultrafiltration membrane having a molecular weight cutoff up to about 50,000 Daltons under conditions at which the flavoring compounds pass through the membrane, leaving the retained whey protein material with improved flavor.

23 Claims, 2 Drawing Sheets

U.S. PATENT DOCUMENTS

| | | | |
|---|---|---|---|
| 5,858,442 A | 1/1999 | Payne et al. | |
| 6,022,702 A | 2/2000 | Tsumura et al. | |
| 6,068,865 A | 5/2000 | Lee et al. | |
| 6,126,973 A | 10/2000 | Tsumura et al. | |
| 6,136,351 A | 10/2000 | Nauth et al. | |
| 6,139,901 A | 10/2000 | Blazey et al. | |
| 6,221,423 B1 | 4/2001 | Cho et al. | |
| 6,291,009 B1 | 9/2001 | Cohen | |
| 6,383,531 B1 | 5/2002 | Gottemoller et al. | |
| 6,399,135 B1 | 6/2002 | Gottemoller et al. | |
| 6,413,569 B1 | 7/2002 | Borders et al. | |
| 6,479,089 B1 | 11/2002 | Cohen | |
| 6,495,187 B1 | 12/2002 | Borders et al. | |
| 6,528,622 B1 | 3/2003 | Ayers et al. | |
| 6,537,597 B1 | 3/2003 | Nakamori et al. | |
| 6,582,746 B1 | 6/2003 | Altemueller et al. | |
| 6,630,195 B1 | 10/2003 | Muralidhara et al. | |
| 6,787,173 B1 * | 9/2004 | Akashe et al. | 426/422 |
| 2001/0055642 A1 | 12/2001 | Cohen | |
| 2002/0098276 A1 | 7/2002 | Porter et al. | |
| 2002/0102339 A1 | 8/2002 | Akashe et al. | |
| 2002/0102346 A1 | 8/2002 | Stark et al. | |
| 2002/0106437 A1 | 8/2002 | Karleskind et al. | |
| 2002/0106440 A1 | 8/2002 | Porter et al. | |
| 2002/0114877 A1 | 8/2002 | Stark et al. | |

FOREIGN PATENT DOCUMENTS

| | | |
|---|---|---|
| GB | 1313085 A | 4/1973 |
| GB | 1363783 A | 8/1974 |
| GB | 1580051 | 11/1980 |
| WO | WO 89/10064 A | 11/1989 |
| WO | WO 02/100186 | 12/2002 |
| WO | WO 03/070007 | 8/2003 |

* cited by examiner

Figure 1

Figure 2

METHOD OF DEFLAVORING WHEY PROTEIN

The present application is a continuation-in-part application of U.S. patent application Ser. No. 09/939,500, filed Aug. 23, 2001, U.S. Pat. No. 6,787,173, which was based on, and claimed benefit of, U.S. Provisional Application Ser. No. 60/250,228, filed on Nov. 30, 2000, both of which are hereby incorporated by reference.

BACKGROUND OF THE INVENTION

This invention relates generally to the processing of whey protein-containing materials for use in various food products. More particularly, the invention relates to a method of deflavoring whey protein materials in order to make them acceptable in a wide range of foods.

In recent years, whey proteins have become widely used in food products, for the health benefits to be obtained from their use. For example, studies suggest that whey proteins may provide a variety of health benefits such as antihypertension activity, immune system enhancement, antimicrobial activity, intestinal health enhancement, and oral hygiene activity. In some applications, the taste of the whey protein materials is not objectionable. However, in some uses, such as dairy analog products, beverages and the like, and especially when the amount of whey protein is increased to the levels associated with such health benefits, the flavors found in whey protein materials may prevent their ready acceptance by the consumer. Thus, in order to extend the uses of whey protein materials, the present inventors wanted to find a method of reducing the flavor components of whey protein materials. However, it was not evident that methods which had been used previously to remove flavor components from other organic materials would be successful in the treating of whey protein materials. Organic materials, since they have complex compositions, must be tested to determine whether any given method of treating them will be satisfactory.

One example of previously employed methods to purify organic materials is found in U.S. Pat. No. 4,477,480, in which the patentees show that starch can be treated with an alkali to remove objectionable flavor components. In a commonly assigned, U.S. Pat. No. 4,761,186, ultrafiltration is used to purify starch. In both cases, flavor components are removed from the starch, in the '480 patent by solubilizing the flavor components so that they can be washed out of the relatively insoluble starch. In the '186 patent, ultrafiltration was used to remove the flavor components as permeate, while the insoluble starch remained in an aqueous slurry. By contrast, the present invention separates flavor components from soluble high molecular weight whey proteins.

There are many articles and patents which relate to processing soy materials in order to recover the protein content and which at the same time reduce the flavor compounds to make the proteins more acceptable in food products. However, these previous disclosures were not specifically directed to removal of flavoring compounds and recovering as much of the protein as possible. One example is U.S. Pat. No. 4,420,425 in which protein components of soy are solubilized at a pH of 7 to 11, preferably about 8 and, after ultrafiltration through a membrane having a molecular weight cut off above 70,000, are recovered by spray drying the retained soy proteins. In variants, only a portion of the protein is solubilized at lower pH values and subjected to ultrafiltration with a membrane having a cutoff preferably above 100,000 molecular weight, the product was found to have improved color and flavor. A higher cutoff valve would be expected to result in a loss of valuable proteins. In another patent, U.S. Pat. No. 5,658,714, a soy flour slurry is pH-adjusted to the range of 7 to 10 to solubilize proteins, which are then passed through an ultrafiltration membrane and phytate and aluminum are retained, presumably as solids. While the molecular weight cutoff of the membrane was not given, it is assumed that the pore size was large in order to be able to pass the soluble proteins. Both of these patents contain extensive discussions of the efforts of others in the processing of soy materials; neither teaches or suggests the control of pH during the ultrafiltration process.

In a group of related patents, Mead Johnson Company disclosed processes for solubilizing soy proteins by raising the pH of an aqueous solution of soy materials and recovering the proteins which are said to have a bland taste. The processes are principally directed to concentrating proteins rather than removing flavor compounds. In U.S. Pat. No. 3,995,071, the pH was increased to 10.1 to 14 (preferably 11 to 12) to solubilize soy proteins, after which the pH was lowered to about 6 to 10 and ultrafiltration with a membrane having a molecular weight cutoff of 10,000 to 50,000 Daltons was used to retain the proteins while discarding carbohydrates and minerals. In U.S. Pat. No. 4,072,670, emphasis was placed on removing phytates and phytic acid by solubilizing proteins at a pH of 10.6 to 14 and a temperature of 10 to 50° C. to make the phytates and phytic acid insoluble, then separating them and finally acidifying the solution to a pH of about 4 to 5 to precipitate the soy proteins. In U.S. Pat. No. 4,091,120 soy proteins were solubilized at a pH less than 10, preferably 7 to 9, and ultrafiltration was used to separate the proteins as retentate, while passing carbohydrates as permeate. These patents do not teach or suggest control of the pH during the ultrafiltration process.

The present inventors wanted to remove compounds in soy protein materials which contribute color and flavor and which interfere with the use of soy protein in certain food products such as beverages, dairy analogs, and the like. They found that soy protein-derived materials can be treated successfully, recovering substantially all of the proteins and rejecting the compounds which cause undesirable color and flavor. Moreover, by controlling the pH within the range of about 8.5 to about 12 during the ultrafiltration process, deflavored soy protein materials having improved functional properties can be obtained. Thus, the product is suitable for many food products. Now the present inventors have surprisingly discovered that a related process can be advantageously applied to whey protein materials to remove undesirable flavor components to obtain a deflavored whey protein material which can be incorporated into many different food products. The process can, however, be modified such that it can be operated in a basic or acid pH range. Thus, either basic or acidic deflavored soy protein can be prepared using the process of this invention.

SUMMARY OF THE INVENTION

Broadly, the invention is a process for preparing an aqueous whey composition having a whey protein concentration of about 1 to about 50 percent, which is pH-adjusted to solubilize the whey protein content and to release the flavoring compounds. Then the composition is subjected to ultrafiltration, while maintaining pH control, using a membrane capable of retaining substantially all of the protein content of the whey protein material while removing flavoring components as permeate. As noted above, the present inventors have now surprisingly discovered that a method used for deflavoring soy protein materials can be used in a similar manner for deflavoring whey protein materials. The present process, as applied to whey proteins, can be run under either acidic or basic conditions as desired to produce either an acidic or a basic deflavored whey protein material.

The deflavored whey protein materials prepared by the present methods are ideally suited for use in dairy and non-dairy beverages, smoothies, health drinks, confectionary type products, nutritional bars, cheeses, cheese analogs, dairy and non-dairy yogurts, meat and meat analog products, cereals, baked products, snacks, and the like. Preferably the acidic deflavored whey protein is used in acidic food products and the basic deflavored whey protein is used in neutral and basic food products. Thus, by proper selection, one can avoid destabilizing the deflavored whey protein associated with passing it through its isoelectric point.

The present invention provides methods for deflavoring whey proteins. In addition to the removal of off-flavors, the present invention also allows the efficient removal of lactose, thereby allowing concentration of the whey proteins to high levels. Typically whey protein contains about 70 to about 80 percent (dry basis) lactose. Generally, levels of lactose less than about 15 percent (dry basis) can be obtained in the deflavored whey protein. By extensive ultrafiltration/ difiltration (i.e., greater than 5 wash cycles and typically in the range of about 6 to 7 wash cycles), the level of lactose can be reduce to less than about 99 percent (dry basis). Moreover, the deflavored whey protein materials can be prepared containing greater than about 50 percent protein (on a dry basis), and preferably about 65 to about 95 percent protein; obtaining higher levels of protein (generally greater than about 85 percent) require extensive ultrafiltration/ diafiltration. Thus, it becomes possible to incorporate whey protein in conventional food products at sufficiently high levels (generally sufficient to provide about 2.5 to about 20 g whey protein per single serving size (generally about 25 to about 100 g for solid food products and about 100 to about 300 ml for liquid food products)) to provide health benefits of whey protein. Prior to this invention, incorporation whey proteins at such levels generally resulted in significant off-flavors and, therefore, only very limited acceptance by consumers. Moreover, the removal of lactose may allow the use of such food products by lactose-intolerant consumers; generally, in such cases, at least about 95 percent of the lactose should be removed.

In one aspect, the invention is a method of deflavoring whey protein materials, which method includes preparing an aqueous composition of the whey protein material containing flavoring compounds, adjusting the pH to a basic range of about 8.5 to about 12 or to an acidic range of about 2.4 to about 4 to solubilize the protein content of the whey protein material and release the flavor components, and then passing the pH-adjusted composition adjacent to an ultrafiltration membrane having pores which provide a molecular weight cutoff up to 50,000 Daltons, while maintaining the pH in the same range as to which the aqueous composition was adjusted, thus retaining substantially all of the whey protein content, while passing through the pores the flavor producing compounds.

In another aspect (herein termed the "basic mode of operation"), the invention includes adjusting the pH to the range of about 8.5 to about 12 with an alkali such as sodium, potassium or calcium hydroxides to maintain the solubility of the whey protein content and release the flavor compounds, making it possible to separate such compounds by ultrafiltration. Importantly, the pH in this basic mode of operation is also controlled within the range of about 8 to about 12 during the ultrafiltration process.

In another aspect (herein termed the "acidic mode of operation"), the invention includes adjusting the pH to the range of about 2.5 to about 4 with an edible acid (e.g., citric acid, acetic acid, lactic acid, malic acid, ascorbic acid, fumaric acid, adpidic acid, phosphoric acid, sodium hydrogen sulfate, and the like) to maintain the solubility of the whey protein content and release the flavor compounds, making it possible to separate such compounds by ultrafiltration. The preferred edible acids for use in this acidic mode of operation include phosphoric acid, citric acid, and malic acid. Importantly, the pH in this acidic mode of operation is also controlled within the range of about 2.5 to about 4 during the ultrafiltration process.

Native whey proteins (i.e., undenatured) are generally soluble over a wide range of pH values. Denaturing of such protein, as often occurs during processing (e.g., cheese manufacture, pasteurization, elevated temperature, ultrafiltration, and the like) have decrease solubility (especially around the isoelectric point of about 7.4). Maintaining the pH of the deflavored whey protein in essentially the same range as its ultimate use in a food product allows the maintenance of desired solubility. Using a deflavored whey protein prepared using the basic mode of operation in a neutral or basic food product and using a deflavored whey protein prepared using the acidic mode of operation in an acidic food products avoids modifying the pH of the deflavored whey protein (and passing it through its isoelectric point) and thereby provides maximum solubility in the food product.

In one embodiment, the invention is a method for deflavoring whey protein materials in a continuous process wherein a pH-adjusted aqueous mixture of whey protein materials is passed adjacent an ultrafiltration membrane to separate the flavor components. The pH is maintained at about 8.5 to about 12 for the basic mode of operation or at about 2.5 to about 4 for the acidic mode of operation during the ultrafiltration by the addition of the appropriate amount of an appropriate pH-altering material (i.e., a base or acid depending on the desired mode of operation). The permeate containing flavor components, lactose, minerals, and water is passed adjacent a reverse osmosis membrane to dewater the permeate and the separated water is recycled to join recycled retentate and fresh pH-adjusted whey materials. A portion of the retentate is continually removed and the deflavored whey protein materials recovered.

In a preferred embodiment, the invention is a method for deflavoring whey protein materials in a batch or semi-continuous process wherein a pH-adjusted aqueous mixture of whey protein materials is passed adjacent an ultrafiltration membrane, the permeate is separated for recovery of the flavor components, and the retentate is recycled to join fresh pH-adjusted whey protein materials. Water is added periodically or continuously to replace the water lost to the permeate and to adjust the concentration of whey materials in the combined stream to a predetermined level. If necessary, a pH-altering material (e.g., a base or an acid) can be added to the recycled retentate or added water to control the pH to the desired range during the ultrafiltration process. The process is continued until essentially all of the flavoring compounds have been removed. If desired, the process can also be continued until sufficient levels of lactose removal have been obtained; such reduced lactose materials may be used in food products directed to lactose-intolerant individuals.

In another preferred embodiment, the present invention provides a method for preparing deflavored whey protein material, said method comprising:

(a) preparing an aqueous composition of a whey protein material containing soluble whey proteins and flavoring compounds;

(b) adjusting the aqueous composition of (a) to either (1) a basic pH in the range of about 8.5 to about 12 or (2) an acidic pH in the rang of about 2.5 to about 4;

(c) passing the aqueous composition of (b) adjacent an ultrafiltration membrane having a molecular weight cutoff up to about 50,000 Daltons, while maintaining the pH in the same range as adjusted in step (b), under suitable ultrafiltration conditions wherein the flavor compounds pass through the membrane, thereby deflavoring the whey protein material and retaining substantially all of the soluble whey proteins; and (d) recovering the soluble whey proteins retained by the ultrafiltration membrane to obtain the deflavored whey protein material. It is generally preferred that any insoluble materials be removed from the whey protein composition prior to the ultrafiltration step. Removal of such insoluble materials (which could include, for example cheese fines, fat globules, and casein aggregates using whey derived from a cheese making process) could be carried out at any time before ultrafiltration step, including before the preparing the initial aqueous solution of step (a).

The ultrafiltration membrane used in the method of the invention will have a molecular weight cutoff up to 50,000 Daltons, preferably 1,000 to 50,000, most preferably about 10,000.

DESCRIPTION OF THE PREFERRED EMBODIMENTS

Whey Protein Materials. Whey proteins have high nutritive value for humans. In fact, the amino acid composition of such whey proteins is close to an ideal composition profile for human nutrition. Unfortunately, use of such whey proteins in food compositions have been limited due to undesirable odors and/or flavors as well as other organoleptic problems associated with whey proteins. Normal whey protein materials generally have significant lactose, milky, and animal flavors which can impact the flavor profiles of food products, especially otherwise bland food products. Off flavors in whey protein materials are generally attributed to lipid oxidation of unsaturated fatty acids during, or after, the cheese making process and/or to Maillard browning reactions. Lipid oxidation can result in formation of volatile aldehydes, ketones, esters, and alcohols, which appear to contribute to a cardboard-like flavor. Typically, whey protein materials contribute, or provide, off flavors described as carboardy, musty, metallic, sour, cooked, astringent, and diacetyl; see, for example, Laye et al., *Milchwissenschaft*, 50, 268–272 (1995); Carunchia Whetstine et al., *J. Dairy Sci.*, 86, 439–448 (2003).

The present inventors have found that defects normally associated with whey proteins can be significantly reduced, and in some cases eliminated, using the process of this invention. Deflavored whey protein as produced by the present invention can not only be used in a wide variety of food products, but they can be used in higher levels that has been possible before, thereby providing nutritionally superior food products. Deflavored whey proteins can be prepared from, for example, whey obtained from conventional cheese making processes, whey protein isolate, whey protein concentrate, and the like.

Ultrafiltration Membranes. Filtration is used to separate many materials. In the present invention, ultrafiltration is used to remove flavoring compounds from whey protein materials. Importantly, the pH of the whey protein material should be maintained in the range of about 8 to about 12 during the ultrafiltration process. Ultrafiltration is intended to remove particles having a size between 10 to 1,000 Angstroms (0.001 to 0.1 µm), corresponding generally to particles having a molecular weight between 10,000 and 1,000,000, and which may also be affected by the shape of such high molecular weight particles. Whey proteins have molecular range between about 14,000 and 100,000. A typical analysis of whey proteins is provided in the table below:

| Whey Protein Facti n | MW (daltons) | Percentage of Total Whey Proteins |
|---|---|---|
| Beta-lactoglobulins | 18300 | 50 |
| Alpha-lactoalbumin | 14000 | 12 |
| Immunoglobulins | 15000–100,000 | 10 |
| Bovine Serum Albumin | 69000 | 5 |
| Proteose-peptones | 4100–41,000 | 23 |

A membrane may be chosen which is capable of passing all of the whey proteins or only a selected portion. In the present invention, the whey proteins are retained by the ultrafiltration membrane under the selected operating conditions, while the lower molecular weight flavoring compounds pass through the membrane and are separated, thus improving the color and flavor of the retained whey proteins and associated solids.

A polymer ultrafiltration membrane may be defined as an anisotropic (non-uniform) layer. One face is a skin containing pores which determine the size of molecules which can pass through the membrane. Supporting the surface skin is a spongy structure which extends to the opposite face. Such membranes are commonly made by coagulation of polymers in an aqueous bath. Typical polymers which are used include polysulfones, cellulose esters, poly(vinyidenefluoride), poly (dimethylphenylene oxide), poly (acrylonitrile), which can be cast into membranes. Often, the membranes are formed into hollow tubes which are assembled into bundles, through which the solution to be filtered is passed. Alternatively, flat membrane sheets and spiral designs may be used. In commercial practice, pressure is applied to facilitate movement of the lower molecular weight compounds through the membrane. The membrane must be able to withstand the pressures used, making it important that the spongy supporting structure be uniform to avoid breaking the surface skin and bypassing the membrane.

In addition to the polymeric membranes just described, other materials have been used to make ultrafiltration membranes, such as ceramics, sintered metals, and other inorganic materials. The present invention is not limited to any particular type of membrane. In general, the membrane must be able to pass the flavoring compounds, which are believed to have molecular weights lower than 1,000 Dalton. More importantly, the membranes must be able to retain substantially all of the solubilized whey proteins. Thus, the membrane of the invention will have a molecular weight cutoff up to about 50,000 Daltons, preferably about 1,000 to 50,000 Daltons, more preferably 10,000 to 30,000 Daltons.

Process. The process of the invention includes the following steps:

(1) Prepare an aqueous mixture of the whey protein material. In cases where the original whey protein material is an aqueous solution (e.g., whey from a cheese manufacturing process), the material may be used as is, or additional water may be added or removed as desired, to form the aqueous mixture. For dried whey materials (e.g., whey protein isolate, whey protein concentrate, and the like), water will, of course, need to be added to form the aqueous mixture.

(2) Determine whether to employ the basic or acid mode of operation. This determination will normally depend on the anticipated end use of the deflavored whey protein. If the deflavored whey protein is intended to be used in a food product normally having a neutral or basic pH, the basic mode of operation will be preferred. If the deflavored whey protein is intended to be used in a food product normally having an acidic pH, the acidic mode of operation will be preferred. For the basic mode of operation, add a base to raise the pH of the aqueous mixture to about 8.5 to about 12 in order to maintain the solubility of the whey proteins and to release the flavoring compounds. For the acidic mode of operation, add an acid to lower the pH of the aqueous mixture to about 2.5 to about 4 in order to maintain the solubility of the whey proteins and to release the flavoring compounds.

(3) Pass the pH-adjusted mixture, while maintaining the pH in the same range as used in step (2) above, adjacent to an ultrafiltration membrane having a molecular weight cutoff up to about 50,000 Daltons, remove the flavoring compounds as permeate, and remove the remaining whey proteins and other whey materials as retentate.

(4) Neutralize the retentate and recover the whey proteins.

All types of whey protein materials are considered to be potential sources of whey protein for use in the present invention and ultimately for use in food products. Thus, for example, suitable whey protein materials includes whey obtained from conventional cheese making processes, whey protein isolate, whey protein concentrate, and the like. Thus, whey protein materials which contain whey proteins are provided in or combined into an aqueous mixture, generally a slurry of whey protein solids. The protein content is needed for food products, but as discussed above, it is believed to contain flavoring compounds which must be released in order that they can be separated. The separation of flavoring compounds is carried out in an aqueous mixture in which both the proteins and flavoring compounds are dissolved. The concentration of the whey protein materials in the aqueous mixture will be in the range of about 1 to about 50 percent. Generally, the concentration of whey protein materials after pH adjustment will change during the subsequent ultrafiltration step as water is removed with the permeate. The water will be replaced either periodically or continuously. For example, in diafiltration water is added to gradually dilute the retained proteins in a batch or semi-continuous process.

The second step, as will be seen in the examples, is important if removal of the flavoring compounds is to be accomplished. The whey proteins are solubilized by adding the appropriate pH-modifying agent base to the aqueous mixture to achieve either a pH of about 8.5 to about 12 (the basic mode of operation) or a pH of about 2.5 to about 4 (the acidic mode of operation).

For the basic mode of operation, it has been found that a pH of about 8.5 or above is needed to maintain the solubility of the whey proteins during ultrafiltration, while a pH higher than about 12 is likely to cause undesirable degradation of the proteins. While in theory, any base might be used, sodium or potassium hydroxide are preferred, particularly potassium hydroxide. Other bases which may have application include calcium, magnesium and ammonium hydroxides. For the acidic mode of operation, while in theory any edible acid might be used, phosphoric acid, citric acid, and malic acide are preferred, with phosphoric acid being particularly preferred.

It is believed that maintaining the solubility of solubilizing the whey proteins during ultrafiltration allows the flavoring compounds to remain in a form in which they can be removed; if the whey protein denature during ultrafiltration, the flavoring compounds may become bound or encapsulated by the whey proteins, thereby preventing or reducing the effectiveness of their removal. The flavoring compounds, which have relatively low molecular weight compared to the whey proteins are able to pass through the pores of the ultrafiltration membrane, while substantially all of the solubilized whey proteins are too large and are retained. Importantly, the pH should be maintained within the just described ranges (i.e., about 8.5 to about 12 for the basic mode of operation or about 2.5 to about 4 for the acidic mode of operation) during the ultrafiltration/diafiltration process to allow as much of the flavoring compounds as possible to be removed.

The third step could be carried out in a batch manner similar to the laboratory experiments reported below in Examples 1–5 in which the flavor compounds and water passed through the membrane and were removed by flowing water. However, in commercial applications of the process of the invention, the pH-adjusted aqueous mixture would be circulated continuously adjacent to an ultrafiltration membrane. Since water, the pH-modifying agent, and the flavoring compounds pass through the membrane as permeate and are discarded, additional water will be added to maintain the desired concentration of whey protein materials, which will tend to change the pH of the aqueous mixture. This water may be augmented by dewatering the permeate and recycling the recovered water to the feed stream. A pH-modifying material (e.g., base or acid as appropriate) can be added as necessary to control the pH in the desired range (i.e., about 8.5 to about 12 for the basic mode of operation or about 2.5 to about 4 for the acidic mode of operation)) directly to the ultrafiltration solution, to any recycled aqueous material, or to makeup water as desired.

After removal of the flavoring compounds (i.e., after completion of the ultrafiltration process), further neutralization of the filtered solution may be accomplished by withdrawing product and adding an acid as required to reach the desired pH. After pH adjustment, the aqueous mixture of whey proteins and other materials may be used directly in food products, or it may be concentrated or dried as required for the intended use.

Figure 1:
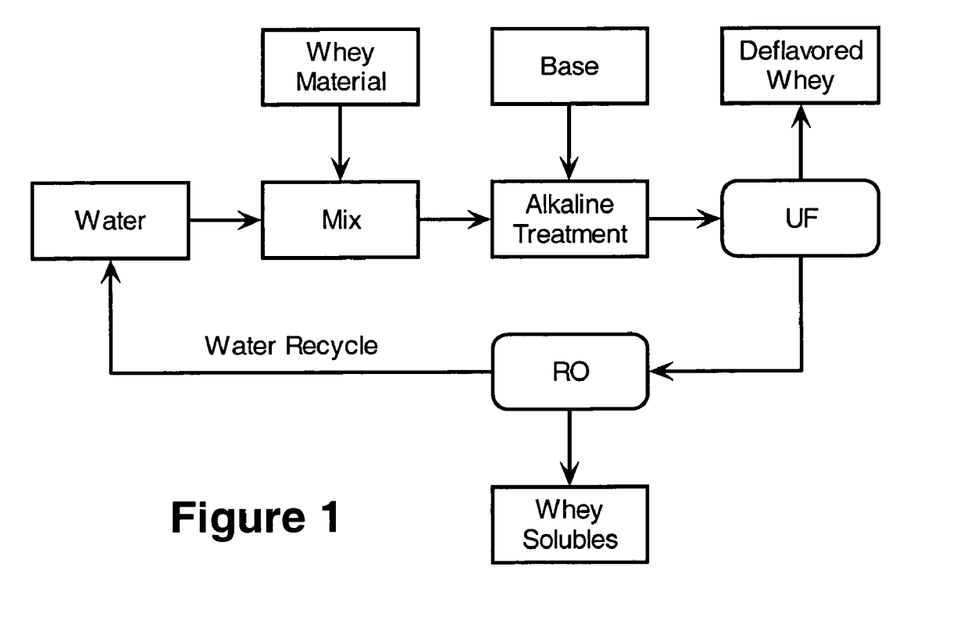
FIG. 1 is a block diagram of one process employing the invention.

A process for deflavoring whey protein materials by ultrafiltration may be operated in various ways. The pH during the ultrafiltration/diafiltration process is maintained in the desired range (i.e., about 8.5 to about 12, and preferably about 9.5 to about 10.5, for the basic mode of operation; or about 2.5 to about 4, and preferably about 2.8 to about 3.8, for the acidic mode of operation). Two methods will be described, continuous processing and batch (including semi-continuous operation) processing. It is expected that commercial processes will adopt batch or semi-continuous operation, which should be better suited to production of food-grade whey protein products. A continuous process is generally shown in FIG. 1. In either a continuous or batch process an aqueous mixture of whey protein materials is pH adjusted to solubilize whey proteins and release flavor compounds and then passed adjacent an ultrafiltration membrane which permits the lower molecular weight flavoring materials to pass through its pores along with water (the permeate), leaving the higher molecular weight whey protein materials (the retentate) to be recirculated. A portion of the retentate will be withdrawn as deflavored product, from which the whey protein materials can be recovered as needed for the ultimate end use. Water will be added to replace that lost in the permeate and to provide a constant concentration of whey protein materials in the feed stream supplied to the ultrafiltration membrane. Although not essential to the process, the process of FIG. 1 includes additional processing of the permeate to recover a portion of the water using a reverse osmosis membrane for recycling to join the retentate and fresh whey protein materials. The advantage of such a step is in reducing the amount of fresh water which must be added to the process and removed in concentrating the permeate. Of course, the pH of the whey protein materials can be kept within the desired range by appropriate addition of a base or acid, as appropriate, to the recycled or fresh water added to the process or by direct addition of base as desired.

In a batch process, such as those described in Examples 6–8 below, a batch of whey protein material is placed in a vessel, pH adjusted, and fed to an ultrafiltration membrane. The permeate is separated and the retentate is returned to the vessel. As the process proceeds, the whey protein material is depleted in the lower molecular weight flavoring compounds and water and becomes more concentrated in the desirable whey proteins. Periodically, water is added to the retentate to dilute it and provide a carrier for the flavoring compounds which are passed through the membrane. In a semi-continuous process the water is added continuously at the rate it is being removed in the permeate. The process is continued until all of the flavoring compounds have been removed and the retentate is sufficiently deflavored to become the product, which can be further processed as required for the ultimate end use. A batch or semi-continuous process may also include the concentration of the permeate, with recycle of separated water in a similar manner as that shown in FIG. 1. The pH during the ultrafiltration/diafiltration process is maintained in the desired range (i.e., about 8.5 to about 12, and preferably about 9.5 to about 10.5, for the basic mode of operation; or about 2.5 to about 4, and preferably about 2.8 to about 3.8, for the acidic mode of operation).

The ultrafiltration membrane will be operated with a pressure differential across the membrane which assists migration of the flavoring compounds, water and other materials which are capable of passing through the pores of the membrane, while not exceeding the physical strength of the membrane. Typical average pressure for such membranes are about 50 psi (345 kPa). The trans-membrane pressure (in versus out) will be about 15 psi (103 kPa). Of course, these pressures could be varied based on the membrane's specifications and other operational concerns. The flow rate of the feed stream will provide sufficient residence time for significant permeate removal, but also will be high enough to provide turbulence so that the access of the feed stream to the membrane pores will not be hindered by solid deposits on the membrane walls. One skilled in the art will understand that suitable operating parameters will be determined by experience with the materials being separated.

In a preferred embodiment (i.e., the basic mode of operation), the present invention provides a method for preparing deflavored whey protein material, said method comprising: (a) providing an aqueous composition of a whey protein material containing soluble whey proteins, flavoring compounds, and insoluble materials; (b) solubilizing the whey proteins by adjusting the aqueous composition of (a) to a pH in the range of about 8.5 to about 12 and releasing the flavoring compounds; (c) removing the insoluble materials from the pH-adjusted aqueous composition of (b) to obtain a treated aqueous composition; (d) passing the treated aqueous composition of (c) adjacent an ultrafiltration membrane having a molecular weight cutoff up to about 50,000 Daltons, while maintaining the pH in the range of about 8.5 to about 12, under suitable ultrafiltration conditions wherein the flavor compounds pass through the membrane, thereby deflavoring the whey protein material and retaining substantially all of the solubilized whey proteins; and (e) recovering the solubilized whey proteins retained by the ultrafiltration membrane to obtain the deflavored whey protein material.

In another preferred embodiment (i.e., the acid mode of operation), the present invention provides a method for preparing deflavored whey protein material, said method comprising: (a) providing an aqueous composition of a whey protein material containing soluble whey proteins, flavoring compounds, and insoluble materials; (b) solubilizing the whey proteins by adjusting the aqueous composition of (a) to a pH in the range of about 2.5 to about 4 and releasing the flavoring compounds; (c) removing the insoluble materials from the pH-adjusted aqueous composition of (b) to obtain a treated aqueous composition; (d) passing the treated aqueous composition of (c) adjacent an ultrafiltration membrane having a molecular weight cutoff up to about 50,000 Daltons, while maintaining the pH in the range of about 2.5 to about 4, under suitable ultrafiltration conditions wherein the flavor compounds pass through the membrane, thereby deflavoring the whey protein material and retaining substantially all of the solubilized whey proteins; and (e) recovering the solubilized whey proteins retained by the ultrafiltration membrane to obtain the deflavored whey protein material.

Figure 2:
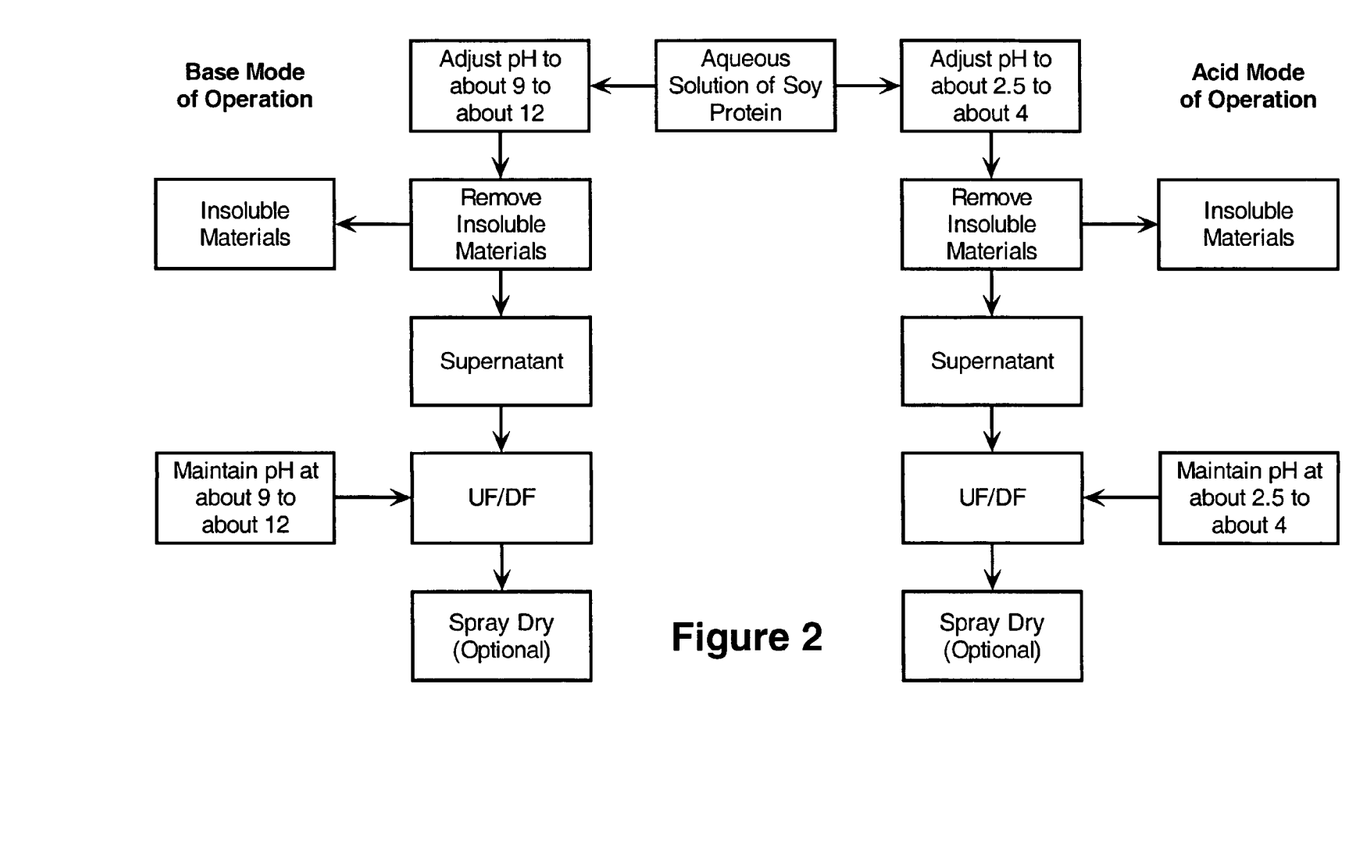
FIG. 2 is a block diagram of a preferred embodiment of the invention.

These preferred embodiments are illustrated in FIG. 2 wherein the pH of an aqueous solution of whey protein is adjusted to either (1) about 8.5 to about 12 for the basic mode of operation or (2) about 2.5 to about 4 for the acidic mode of operation. The pH-adjusted aqueous solution is then treated to remove insoluble materials. Any conventional technique (e.g., filtration, decantation, centrifugation, and the like) can be used. Preferably, the insoluble material is removed by centrifugation. Commercial available continuous centrifugation units are ideally suited for this separation in a semi-batch or continuous type operation. In an especially preferred embodiment, the pH-adjusted aqueous is subjected to the removal technique (e.g., centrifugation) at least twice in order facilitate or more complete removal of insoluble materials. The treated supernatant is then subjected to ultrafiltration, preferably combined with diafiltration, in order to remove the flavor components normally associated with whey and whey protein compositions. During ultrafiltration, the pH of the whey protein material should be maintained in the same range as used in the initial adjustment of the aqueous solution. The deflavored whey protein solution may be used directly or it may be converted to a solid form if desired. Any conventional technique for removing water can be used. Generally, spray or freeze drying techniques are preferred.

Deflavored Whey Protein Products. The deflavored whey protein materials prepared by the present methods are ideally suited for use in dairy and non-dairy beverages, smoothies, health drinks, cheeses, cheese analogs, dairy and non-dairy yogurts, meat and meat analog products, cereals, baked products, snacks, and the like. Generally, such food products may contain up to about 40 percent deflavored whey proteins without significantly impacting organoleptic properties. More preferably, such food products contain about 10 to about 30 percent deflavored whey proteins. Using the deflavored whey protein of this invention it is now possible to incorporate whey protein in conventional food products at sufficiently high levels (generally sufficient to provide about 2.5 to about 20 g whey protein per single serving size (generally about 25 to about 100 g for solid food products and about 100 to about 300 ml for liquid food products)) to provide health benefits of whey protein. Prior to this invention, incorporation whey proteins at such levels generally resulted in significant off-flavors and, therefore, only very limited acceptance by consumers.

Unless noted otherwise, all percentages are by weight. All references cited herein are incorporated by reference.

EXAMPLE 1

Whey protein concentrate (30 lbs. of WPC34 (34 percent protein; Leprino Co., Denver, Colo.) was hydrated with water (170 lbs.) in a mixing tank with vigorous mixing at a temperature of about 120° F. Once hydration was complete (generally within about 10 minutes), the pH was adjusted to 9 using 1 N NaOH. The pH-adjusted solution was then diafiltered through a ultrafiltration membrane (spiral wound type with 10,000 molecular weight cut-off). Diafiltration was continued for an equivalent of 5 wash cycles (each wash defined as the amount of permeate collected equal to one-half of the initial batch size). The pH was maintained at about 9 during the ultrafiltration/diafiltration process. Once diafiltration was completed, solids in the retentate was concentrated to about 20 percent and citric acid (1%) was added to adjust the pH to 6.0. The resulting slurry was freeze dried to obtain a solid deflavored whey protein material. The deflavored whey protein material was found to contain about 2.8 percent ash, about 10.2 percent carbohydrates, about 8.4 percent fat, about 2.2 percent moisture, and about 76.3 percent protein.

Slurries of the deflavored whey protein material and several whey protein-containing control samples were prepared by hydrating the solid materials in water at about 100° F. for about 30 minutes. The samples generally contained about 8 g whey protein per 100 g solution. Controls included untreated WPC34 as well as untreated AMP 800 (80 percent protein; Leprino Co., Denver, Colo.). The AMP 800 contained approximately the same protein level as the deflavored whey protein inventive sample.

Based on an evaluation using a trained taste panel, the deflavored whey protein sample had the best overall taste, followed by the AMP 800 control, with the WPC34 (untreated) having the most off flavors. More specifically, the lactose, milky, and animal flavors normally associated with whey proteins (and detected in both control samples) were essentially eliminated in the inventive sample.

EXAMPLE 2

The deflavored whey protein sample prepared in Example 1 was used to prepare a high protein beverage. The following formulation was prepared: 87.3 percent water, 7.0 percent deflavored whey protein, 2.5 percent salt, 2.5 percent sugar, and 0.2 percent peach flavors. The dry components were first blended and the hydrated in the water using an overhead mixer. Once hydration was complete, the flavor component was added. Stabilizers such as pectin and carrageenan could be added if desired to adjust final product viscosity to the desired level. Sugar could be replaced to high corn syrup or other natural or artificial sweeteners if desired. Based on taste evaluation using a trained taste panel, the beverage was considered excellent with regard to overall mouthfeel and flavor with no off-flavors detected. The resulting beverage delivers about 13 g whey protein per 250 ml serving size.

EXAMPLE 3

This example illustrates the preparation of deflavored whey protein from sweet whey. A clarified sweet whey (also known as rennet whey or cheese whey) was obtained from a cheese making process. The sweet whey contained about 12 percent protein, about 78 percent carbohydrates, and about 1.1 percent fat on a dry basis (remainder mainly ash). The sweet whey had been clarified using centrifugation to remove fat, cheese fines, and caseins, thereby significantly reducing fouling and increasing flux rates in the subsequent ultrafiltration step. About 700 pounds of the sweet whey was heated to about 120° F. in a jacketed reactor; the pH was then adjusted to about 7.5 with the addition of 1 N NaOH. The alkalized whey was then continuously concentrated using ultrafiltration/diafiltration as in Example 1 using a UF sprial membrane with a 10000 molecular weight cutoff. Retentate was recirculated and maintained at about 5 percent solids. Once the solids in the permeate reached about 50 percent of the original solids in the retentate, the pH was readjusted to about 9 using 1N NaOH; the pH was maintained at about the same level throughout the remainder of the UF/DA process. Diafiltration was continued at a constant solids level by the addition of reverse osmosis water at the same rate as removal of permeate until the ratio of solids in the permeate to solids in the retentate reached about 0.1 to about 0.15. The retentate was concentrated to about 10 percent solids, collected, neutralized to pH 6.5 using citric acid (1 percent), and then pasteurized (165° F. for 30 seconds). The pasteurized product was then refrigerated before evaluation. The resulting product contained about 68 percent protein, about 16 percent carbohydrates, and about 6.3 percent fat on a dry basis. The flavor was bland with no off-flavors making it ideal for incorporation into beverages and other food products.

EXAMPLE 4

This example illustrates the preparation of deflavored whey protein from acid whey. Clarified acid whey as concentrated to about 14 percent solids and about 50 percent protein. Clarification was by carried out by centrifugation as in Example 3. Concentrated acid whey (200 pounds) was diluted with about 200 pounds reverse osmosis water and then heated to about 120° F. in a jacketed tank. The pH of the slurry (initially about 4.7) was adjusted to about 9 by slowly adding 1 N NaOH. The alkalized whey was then continuously concentrated using ultrafiltration/diafiltration as in Example 1 using a UF sprial membrane with a 10000 molecular weight cutoff. Reverse osmosis water was added as needed to maintain solids at about 4 to about 7 percent. The pH was maintained at about 9 throughout the UF/DA process. Diafiltration was continued at a constant solids level by the addition of reverse osmosis water at the same rate as removal of permeate until the ratio of solids in the permeate to solids in the retentate reached about 0.1 to about 0.15. The retentate was concentrated to about 14 percent solids, collected, neutralized to pH 6.5 using citric acid (1 percent), and then pasteurized (165° F. for 30 seconds). The pasteurized product was then refrigerated before evaluation. The resulting product contained about 80 percent protein, about 9 percent carbohydrates, and about 4 percent fat on a dry basis (remainder mainly ash). The flavor was bland with no off-flavors making it ideal for incorporation into beverages and other food products. A portion of the product was spray dried for further use and evaluation.

EXAMPLE 5

This examples illustrates the preparation of a high-acid fruit juice beverage containing about 8 g protein per single serving size (about 240 ml) derived from the spray dried deflavored acid whey of Example 4. The beverage was prepared using the following formulation:

| Ingredient | Amount (%) |
| --- | --- |
| Water | 79.3 |
| Deflavored Acid Whey Powder | 4.1 |
| Evaporated Cane Juice | 9.0 |
| Alginate | 0.3 |
| Citric Acid | 0.1 |
| Malic Acid | 0.2 |
| Phosphoric Acid (80%) | 0.1 |
| Ascorbic Acid | 0.03 |
| Strawberry Juice Concentrate (65 Prix) | 0.4 |
| White Grape Juice Concentrate (68 Prix) | 6.4 |
| Strawberry Flavor | 0.2 |
| Coloring (red) | 0.002 |

The deflavored acid whey powder was hydrated in a portion of the water (at about 160° F.). The remainder of the water was to about 160° F. and the alginate and evaporated cane juice added with high agitation. The hydrated whey powder mixture was then added, followed by the various acids, juice concentrates, and remaining ingredients. The mixture was homogenized using a high speed mixer for about 5 minutes. The resulting mixture, which had good flavor, had a pH of about 4.1. Lower pH values (e.g., about 3.5 to about 4) increases stability. Likewise, stabilizers (e.g., pectin, polyglutamic acid, and the like) can be added at relatively low values (e.g., about 0.3 to about 0.4 percent) to increase stability if desired.

EXAMPLE 6

This examples illustrates the preparation of a low acid chocolate beverage containing about 8 g protein per single serving size (about 240 ml) derived from the deflavored acid whey of Example 4. The beverage was prepared using the following formulation:

| Ingredient | Amount (%) |
| --- | --- |
| Filtered Water | 83.4 |
| Deflavored Acid Whey Powder | 4.1 |
| Potassium Citrate | 0.4 |
| Sea Salt | 0.03 |
| Microcrystalline Cellulose | 0.25 |
| Evaporated Cane Juice | 8.5 |
| Cocoa | 1.5 |
| Cream | 1.5 |
| Vanilla Flavor | 0.3 |

The filtered water was divided into two portions of about the same size. The deflavored acid whey powder, about 60 percent of the evaporated cane juice, the microcrystalline cellulose, potassium citrate, and the sea salt were preblended and then added to the first water portion with high agitation to form a first slurry; the cream was then added to the first slurry. The cocoa and the remainder of the evaporated can juice were then preblended and then added to the second water portion with high agitation to form a second slurry. The second slurry was then mixed with the first slurry and then homogenized in a two stage homogenizer (2500/500 psi). After pasteurization at about 195° F. for about 5 to about 10 seconds, the beverage was sealed in heat stable containers and then chilled to about 45° F. Evaluation with a trained test panel indicated that the product had good mouthfeel and texture, excellent cocoa aroma, and pleasant chocolate flavor with no off-flavors or undesirable aftertaste. The vanilla flavor was apparently at too low a concentration to be detected; it may be desirable to increase its level.

EXAMPLE 7

This example illustrates the acidic mode of operation for the deflavoring process. Clarified concentrated acid whey (300 L lbs; WPC 50 as used in Example 4; initial pH 4.7) was diluted with 100 lbs of deionized water in a jacketed tank with overhead mixing. The mixture was heated to about 120° F. by circulating hot water through the jacket. The pH was then adjusted to 3.2 by slowly adding 10% phosphoric acid. The pH-adjusted whey solution was allowed to equilibrate for about 10 minutes and then was continuously concentrated using ultrafiltration/diafiltration as in Example 1 using a UF sprial membrane with a 10000 molecular weight cutoff. Continuous ultrafiltration/diafiltration was carried out for an equivalent of 6 wash cycles at which time the amount of solids in permeate was close to zero. The pH was maintained at about 3.2 throughout the UF/DA process. The retentate was then concentrated to a solids content of about 12 percent. The product was then batched pasteurized at 165° F. for 5 minutes. The pasteurized product was then refrigerated before evaluation. The resulting product contained about 80 percent protein, about 5 to about 10 percent carbohydrates, and about 1 to about 3 percent fat on a dry basis (remainder mainly ash). The flavor was bland with no off-flavors making it ideal for incorporation into beverages and other food products.

EXAMPLE 8

This example illustrates the preparation of a mixed berry, high acid, whey-containing beverage using the deflavored whey protein obtained in Example 7. The following formulation was used:

| Ingredient | Amount (%) |
| --- | --- |
| Deionized Water | 38.8 |
| Deflavored Acid Whey (liquid) | 45.6 |
| Sucrose | 11.1 |
| Strawberry Juice Conc. (65 Brix) | 0.7 |
| White Grape Juice Conc. (68 Brix) | 1.8 |
| Clarified Orange Juice Conc. (58 Brix) | 1.0 |
| Sour Cheery Juice Conc. (68 Brix) | 0.2 |
| Red Raspberry Juice Conc. (68 Brix) | 0.2 |
| Coloring | 0.001 |
| Sodium Citrate | 0.05 |
| Natural Cherry Flavor | 0.05 |
| Natural Mixed Berry Flavor | 0.3 |
| Natural Blueberry Flavor | 0.04 |
| Vitamin Mixture | 0.02 |
| Other Natural Flavors | 0.1 |

The deionized water at 150° F. and the deflavored whey were mixed together. The remaining ingredients were then added in the following order with blending: dry ingredients (sucrose, sodium citrate, vitamin premix, coloring), juice concentrates, and flavors. The resulting beverage was filled into sterile 1-liter bottles. The product was preheated to 170° F. in preheat exchangers and then pasteurized at a minimum temperature of 230° F. and a minimum time of 2 seconds. The product was homogenized at 170° F., then cooled to about 40° F., and filled into individual bottles.

A beverage prepared in such a manner would be expected to have the following nutritional characteristics per single serving size of about 258 g; Calories: 150; Total Fat: 0 g; Cholesterol: 0 mg; Sodium: 30 mg: Total Carbohydrate: 26 g; Dietary Fiber: 0 g; Sugars: 24 g; Protein 10 g; Vitamin A: 30%; Vitamin C: 30%; Calcium 15%; Vitamin E: 30%. Such a beverage would be considered fat free, saturated fat free, and cholesterol free as well as being an excellent source of protein and vitamins A, C, and E.

The finished product provided excellent mouthfeel and was less astringent than similar products prepared with non-deflavored whey products. Since the deflavored whey material was prepared using the acid mode of operation, its pH was close to the desired pH of the final beverage and, therefore, it was not required to be adjusted in such a manner as to pass through its isoelectric point.

The invention claimed is:

1. A method for preparing deflavored whey protein material, said method comprising:
   (a) preparing an aqueous composition comprising a dairy-derived whey protein material containing soluble whey proteins and flavoring compounds;
   (b) adjusting the aqueous composition of (a) to either (1) a basic pH in the range of about 8.5 to about 12 using addition of alkali to the aqueous composition, or (2) an acidic pH in the range of about 2.5 to about 4 using addition of acid to the aqueous composition, thereby releasing the flavoring compounds;
   (c) passing the pH-adjusted aqueous composition of (b) adjacent an ultrafiltration membrane having a molecular weight cutoff up to about 50,000 Daltons, while maintaining the pH in the same range as adjusted in step (b), under suitable ultrafiltration conditions wherein the flavor compounds pass through the membrane, thereby deflavoring the whey protein material and retaining substantially all of the soluble whey proteins; and
   (d) recovering the soluble whey proteins retained by the ultrafiltration membrane to obtain the deflavored whey protein material.

2. The method of claim 1, wherein the pH of the aqueous composition is adjusted to the basic pH in step (b).

3. The method of claim 1, wherein the pH of the aqueous composition is adjusted to the acidic pH in step (b).

4. The method of claim 1, wherein the whey protein material is at least one member of the group consisting of whey from a cheese making process, whey protein isolate, and whey protein concentrate.

5. The method of claim 1, wherein the whey protein material is treated prior to step (c) to remove any water insoluble material that may be present.

6. The method of claim 5, wherein the water insoluble material that may be present is removed from the pH-adjusted aqueous composition using at least one centrifugation step.

7. The method of claim 5, wherein the water insoluble material that may be present is removed using at least one clarification step.

8. The method of claim 4, wherein the aqueous composition of (a) has a concentration of soy material in the range of about 1 to about 50 percent.

9. The method of claim 5, wherein the aqueous composition of (a) has a concentration of soy material in the range of about 1 to about 50 percent.

10. The method of claim 4, wherein the ultrafiltration membrane has a cutoff in the range of about 1,000 to about 50,000 Daltons.

11. The method of claim 5, wherein the ultrafiltration membrane has a cutoff in the range of about 1,000 to about 50,000 Daltons.

12. The method of claim 10, wherein the ultrafiltration membrane has a cutoff in the range of about 10,000 to about 30,000 Daltons.

13. The method of claim 11, wherein the ultrafiltration membrane has a cutoff in the range of about 10,000 to about 30,000 Daltons.

14. The method of claim 12, wherein the ultrafiltration is carried out at a temperature in the range of about 10 to about 60° C. and a suitable pressure.

15. The method of claim 13, wherein the ultrafiltration is carried out at a temperature in the range of about 10 to about 60° C. and a suitable pressure.

16. The method of claim 14, wherein the ultrafiltration membrane is a polymer, ceramic, or inorganic membrane.

17. The method of claim 15, wherein the ultrafiltration membrane is a polymer, ceramic, or inorganic membrane.

18. The method of claim 1, wherein the deflavored whey protein material is further treated to remove water to obtain a solid deflavored whey protein material.

19. The method of claim 6, wherein the deflavored whey protein material is further treated to remove water to obtain the deflavored whey protein material in a solid form.

20. The method of claim 9, wherein the deflavored whey protein material is further treated to remove water to obtain the deflavored whey protein material in a solid form.

21. The method of claim 1, wherein the deflavored whey protein material is spray dried to remove water to obtain the deflavored whey protein material in a solid form.

22. The method of claim 6, wherein the deflavored whey protein material is spray dried to remove water to obtain the deflavored whey protein material in a solid form.

23. The method of claim 7, wherein the deflavored whey protein material is spray dried to remove water to obtain the deflavored whey protein material in a solid form.

* * * * *

UNITED STATES PATENT AND TRADEMARK OFFICE
CERTIFICATE OF CORRECTION

PATENT NO. : 7,094,439 B2
APPLICATION NO. : 10/697402
DATED : August 22, 2006
INVENTOR(S) : Ahmad Akashe et al.

It is certified that error appears in the above-identified patent and that said Letters Patent is hereby corrected as shown below:

Column 16, line 23, delete "soy" and insert --whey--.
Column 16, line 26, delete "soy" and insert --whey--.

Signed and Sealed this

Twentieth Day of May, 2008

JON W. DUDAS
*Director of the United States Patent and Trademark Office*